US008949782B2

(12) United States Patent
Hamlin et al.

(10) Patent No.: US 8,949,782 B2
(45) Date of Patent: Feb. 3, 2015

(54) ENHANCED TIMELINES IN APPLICATION DEVELOPMENT ENVIRONMENTS

(75) Inventors: Matt Hamlin, San Francisco, CA (US); Thomas E. Bednarz, Jr., Natick, MA (US)

(73) Assignee: Adobe Systems Incorporated, San Jose, CA (US)

( * ) Notice: Subject to any disclaimer, the term of this patent is extended or adjusted under 35 U.S.C. 154(b) by 1094 days.

(21) Appl. No.: 12/959,897

(22) Filed: Dec. 3, 2010

(65) Prior Publication Data

US 2014/0289701 A1   Sep. 25, 2014

(51) Int. Cl.
*G06F 9/44* (2006.01)
*G06F 17/30* (2006.01)

(52) U.S. Cl.
CPC ........... *G06F 17/30064* (2013.01); *G06F 8/70* (2013.01)
USPC ............................ 717/113; 717/115; 715/255

(58) Field of Classification Search
CPC ........... G06F 17/3064; G06F 9/45529; G06F 17/30126; G06F 3/048; G06F 17/30064; G06F 8/70
USPC .................................................. 717/101–178
See application file for complete search history.

(56) References Cited

U.S. PATENT DOCUMENTS

| | | | | |
|---|---|---|---|---|
| 7,797,679 | B2 * | 9/2010 | Tysowski et al. | 717/121 |
| 8,209,633 | B1 * | 6/2012 | Eismann et al. | 715/835 |
| 8,516,440 | B1 * | 8/2013 | Riggins et al. | 717/110 |
| 8,522,203 | B1 * | 8/2013 | Tibbett et al. | 717/115 |
| 2002/0161462 | A1 * | 10/2002 | Fay et al. | 700/94 |
| 2004/0001106 | A1 * | 1/2004 | Deutscher et al. | 345/838 |
| 2004/0268224 | A1 * | 12/2004 | Balkus et al. | 715/500.1 |
| 2007/0083813 | A1 * | 4/2007 | Lui et al. | 715/709 |
| 2008/0010601 | A1 * | 1/2008 | Dachs | 715/751 |
| 2008/0046562 | A1 * | 2/2008 | Butler | 709/224 |
| 2008/0109727 | A1 * | 5/2008 | Colle et al. | 715/719 |
| 2008/0294663 | A1 * | 11/2008 | Heinley et al. | 707/100 |
| 2010/0058220 | A1 * | 3/2010 | Carpenter | 715/772 |

(Continued)

OTHER PUBLICATIONS

Flexible Timeline User Interface using Constraints—Kazutaka Kurihara Department of Computer Science The University of Tokyo; David Vronay Center for Interaction Design Microsoft Research Asia; Takeo Igarashi Department of Computer Science The University of Tokyo—CHI 2005 Late Breaking Results: Posters Apr. 2-7 Portland, Oregon, USA.*

(Continued)

*Primary Examiner* — Lewis A Bullock, Jr.
*Assistant Examiner* — Francisco Aponte
(74) *Attorney, Agent, or Firm* — Kilpatrick Townsend & Stockton LLP (57) ABSTRACT

A computerized device can comprise a display adapter and a data processing hardware element, such as a processor. The data processing hardware element implements a timeline view module to provide output via the display adapter to display a timeline of an application under development. The timeline can comprise a plurality of tracks, including a track providing a temporal view of each of a plurality of media components of the application and a scripting track providing a temporal view of scripting components of the application. The scripting track can be rendered and populated by default by the timeline view module, and can be kept in view even when other tracks are scrolled out of view. The timeline view module can respond to input events directed to the scripting track to define scripting actions such as labels and actions used to control the application.

19 Claims, 4 Drawing Sheets

(56) References Cited

U.S. PATENT DOCUMENTS

| | | | |
|---|---|---|---|
| 2010/0107079 A1* | 4/2010 | Langmacher et al. | 715/720 |
| 2011/0179398 A1* | 7/2011 | Peterson | 717/115 |
| 2013/0124990 A1* | 5/2013 | Lettau | 715/716 |
| 2013/0239090 A1* | 9/2013 | Hamlin et al. | 717/123 |

OTHER PUBLICATIONS

Luka, "Controlling the timeline with ActionScript," Flashexplained.com, available at http://flashexplained.com/actionscript/controlling-the-timeline-with-actionscript/ (last accessed Nov. 18, 2010).

Adobe Systems Incorporated, Using Adobe Flash CS4 Professional (Mar. 5, 2009).

Adobe Systems Incorporated, "The Timeline," "Chapter 7: Timelines and Animation," and "Chapter 17: Best practices," in Using Adobe Flash CS4 Professional, at pp. 22-25, 172-233, and 418-452 (Mar. 5, 2009).

Adobe Sytems Incorporated, "Team Adobe Premiere Pro with Encore DVD," available at http://www.adobe.com/designcenter/encore/articles/enc2am_withpremiere.html (last accessed Nov. 18, 2010).

Adobe Systems Incorporated, "Add comments, chapters, and links to sequence markers," Adobe Premiere Pro CS4 Help, available at http://help.adobe.com/en_US/PremierePro/4.0/WSD5FD61AC-2568-48f2-A997-2758A79C5298.html (last accessed Nov. 18, 2010).

\* cited by examiner

ENHANCED TIMELINES IN APPLICATION DEVELOPMENT ENVIRONMENTS

BACKGROUND

Software developers rely on application development environments (ADEs) to write code defining the visual appearance and behavior of an application under development. As an example, a developer of an application, such as an Adobe® Flash® or AIR® application, may use an ADE that allows the developer to place media components (e.g., images, movieclips, etc.) on a stage and define a desired visual arrangement of the components, along with changes in the composition and/or position of the components as the application executes.

The ADE can generate suitable code so that when the application is executed or interpreted, the media components are instantiated. Additional code can be defined by the developer (and/or can be automatically generated) to provide the desired changes in composition and position of the components. For example, a scripting language (such as ActionScript®) can be used to define code that causes the application to take an action, such as jumping to a visual arrangement labeled as a frame, in response to an event. The action may be associated with one of the media elements.

As a particular example, one or more media elements may define a button rendered in an initial view of the application. An action can be defined so that, when the button is pressed, the application jumps to a frame in which another media element, such as an image or video clip, is displayed.

The ADE may provide a timeline view showing the various media elements of the application over time. However, the application may be intended to execute non-linearly via the use of scripted actions, and the developer may encounter difficulty identifying and/or defining appropriate labels and scripting elements as the application grows more complex.

SUMMARY

A computerized device can comprise a display adapter and a data processing hardware element, such as a processor. The data processing hardware element implements a timeline view module to provide output via the display adapter to display a timeline of an application under development. The timeline can comprise a plurality of tracks, including a track providing a temporal view of each of a plurality of media components of the application and a scripting track providing a temporal view of scripting components of the application. The scripting track can be rendered and populated by default by the timeline view module and can be kept in view even when other tracks are scrolled out of view. The timeline view module can respond to input events directed to the scripting track to define scripting elements such as labels and actions used to control the application. By providing the scripting track(s) by default (i.e., without requiring the user to independently create a scripting track) and associating particular behaviors with the scripting track(s), the development process can be improved.

This illustrative embodiment is discussed not to limit the present subject matter, but to provide a brief introduction. Additional embodiments include computer-readable media embodying an application configured in accordance with aspects of the present subject matter to provide a timeline view including one or more scripting tracks, along with computer-implemented methods for providing timeline views with scripting tracks. These and other embodiments are described below in the Detailed Description. Objects and advantages of the present subject matter can be determined upon review of the specification and/or practice of an embodiment configured in accordance with one or more aspects taught herein.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
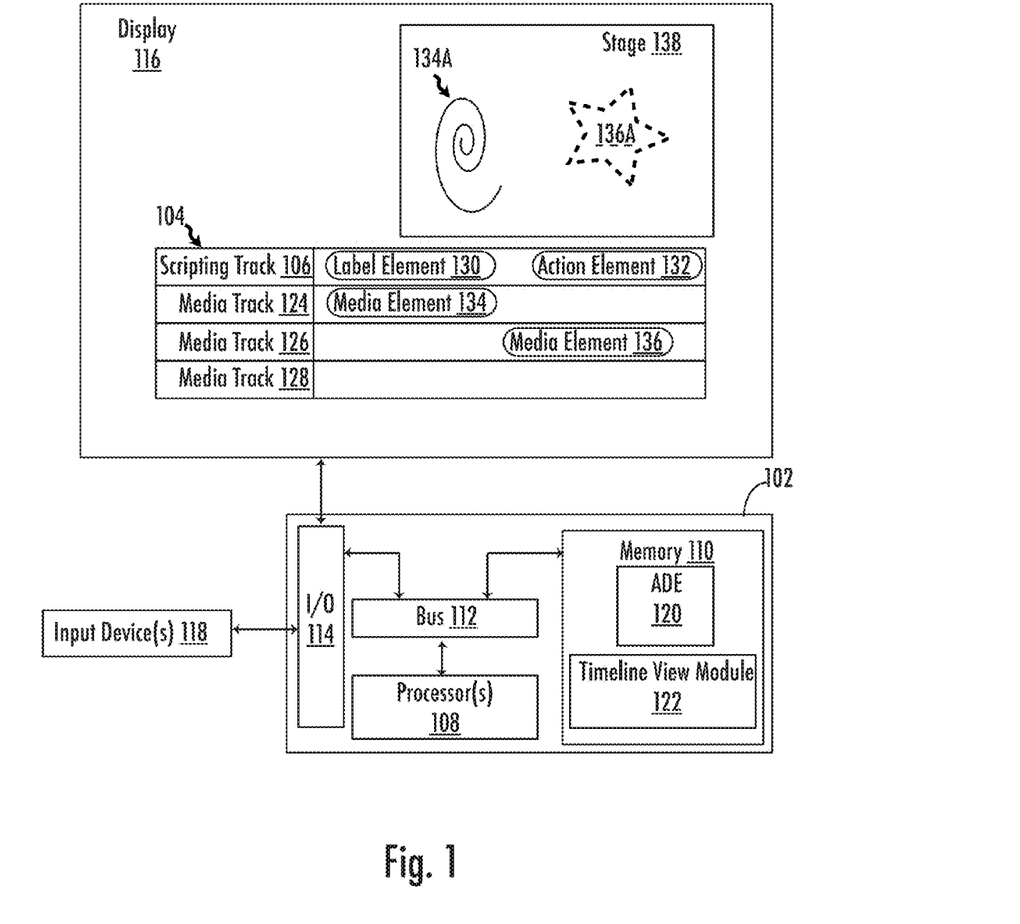
FIG. 1 is a block diagram showing an illustrative computing device implementing a timeline view.

Presently-disclosed embodiments include computing systems, methods, and computer-readable media embodying code to implement a timeline view module. For example, as shown in FIG. 1 a computing device 102 can provide a timeline interface 104 depicting media components of an application under development. Timeline interface 104 includes one or more dedicated scripting tracks 106 that can be used to view scripting components of the application under development in a centralized location.

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment.

In the following detailed description, numerous specific details are set forth to provide a thorough understanding of the subject matter. However, it will be understood by those skilled in the art that the subject matter may be practiced without these specific details. In other instances, methods, apparatuses or systems that would be known by one of ordinary skill have not been described in detail so as not to obscure the subject matter.

FIG. 1 is a diagram showing an example of a computing device 102. Computing device 102 may alternately be referred to as a data processing system, computerized device, or simply a "computer." Computing device 102 represents a desktop, laptop, tablet, or any other computing system, such as mobile devices (PDAs, smartphones, media players, gaming systems, etc.) or embedded systems (e.g., in vehicles, appliances, or other devices).

In the example shown in FIG. 1, computing device 102 features a data processing hardware element comprising one or more processors 108 and a computer-readable medium (memory 110) interconnected via internal busses 112, connections, and the like. Bus 112 also connects to I/O components 114, such as universal serial bus (USB), VGA, HDMI, or other display adapter(s), serial connectors, and/or other I/O connections to other hardware of the computing system. The hardware also includes one or more displays 116. It will be understood that computing device 102 could include other components, such as storage devices, communications devices (e.g., Ethernet, radio components), and other I/O components such as speakers, a microphone, or the like. Input device(s) 118 can comprise hardware used to provide input—examples include a keyboard, trackpad, mouse, touch-sensitive display, etc.

Computer-readable medium 110 may comprise RAM, ROM, or other memory and in this example embodies program logic for an application development environment (ADE) 120 and a timeline view module 122. Timeline view module 122 can be integrated into ADE 120 or may be provided as a separate program component or process. In one implementation, timeline view module 122 is included in an ADE such as Adobe® Flash® Professional available from Adobe Systems Incorporated of San Jose, Calif., and can be used to develop Adobe® Flash® or AIR® applications and/or applications of another type. This example shows a locally-executing timeline view module and ADE, but either or both components could be hosted at a remote server and accessed by a client device, with the client using a client-side front end to provide a UI based on data received from the hosted service.

Generally speaking, timeline view module 122 causes computing device 102 to provide a timeline interface 104 including one or more dedicated scripting tracks 106 as noted herein. Timeline view module 122 can be implemented in software as shown in this example, or could be implemented using hardware accessible by or as part of the data processing element (e.g., as an application-specific integrated circuit, (ASIC) or programmable logic device (e.g., PLAs, FPGAs, etc.)).

In this example, timeline view module 122 causes computing device 102 to provide timeline interface 104 having four tracks—a scripting track 106 and media tracks 124, 126, and 128. For example, each media track may correspond to a layer or other logical unit used in defining a desired appearance of an application under development over time. The timeline can provide a temporal view by representing time on one axis (e.g., the x-axis), with different tracks adjacent to one another on a different axis (e.g., the y-axis) so that a temporal relationship amongst elements in the timeline can be visualized.

In this example, scripting track 106 includes a label element 130 and an action element 132. Label element 130 may identify a segment of the application and can be relied upon by other scripting components in order to shift the application to the corresponding segment (e.g., a frame) based on input events. For example, label element 130 may be associated with a first frame or series of frames during which media element 134 is presented. During a later frame or series of frames, a different media element 136 replaces media element 134 in the view provided by the application under development, with a label element used to return to the first frame or series of frame.

Action element 132 represents a portion of scripting code that causes the application under development to respond to one or more input events or conditions. For example, an action may be defined by a portion of code as a series of discrete operations to be performed at a particular time by the application under development. As an example, the operations may be causing the application under development to respond to an event by jumping from a later frame back to the frame labeled using label element 130. For instance, the action may be associated with media element 136 so that a click on element 136 returns the application to the frame in which media element 134 is visible.

In FIG. 1, ADE 120 also provides a design view including stage 138, which allows a user to arrange and preview the appearance of the application under development. In this example, a representation 134A of media element 134 is visible. This would be the case, for example, if the frame(s) containing media element 134 were selected via the timeline (such as by moving a playhead, selecting a frame number, etc.). A representation 136A of media element 136 is shown using dashed lines to indicate how, if the timeline were advanced to a later frame, media element 136A would become visible in stage 138.

FIGS. 2A-2D show an illustrative timeline interface 104 in closer detail. Timeline interface 104 includes a time index 200 indexing the timeline by frame number, though of course some other designation could be used. In these examples, scripting track 106 includes a first track 202 for specifying label elements and second track 204 for specifying action elements. A plurality of media element tracks 206 can be used for specifying media elements at various points in the application timeline.

Figure 2A:
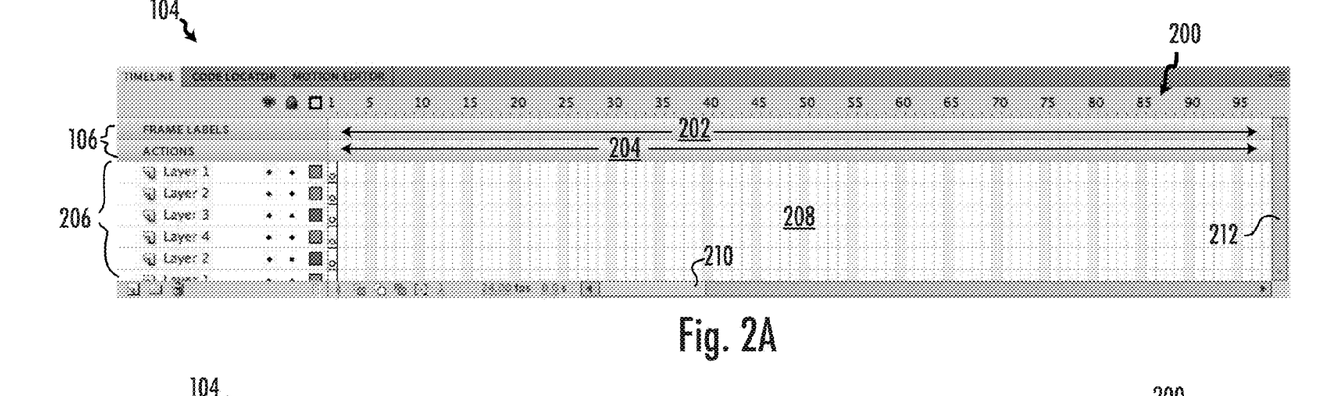
FIGS. 2A-2D provide examples of a timeline interface.

As shown here, each track is rendered using a plurality of cells 208, with the cells extending the width of the track. Cells that are adjacent to one another in the y-direction represent elements of the application that are associated with the same point in the timeline (e.g., associated with the same frame number).

Timeline interface 104 also includes interface elements to scroll through the plurality of media element tracks 206, shown here as scrollbars 210 and 214. In some implementations, scripting tracks 106 are "pinned" such that the scripting tracks remain in view while the other tracks are scrolled in and out of view. This may assist developers in making effective use of the scripting tracks as a centralized location for specifying/editing scripting elements even when a large number of tracks are being utilized.

Figure 2B:
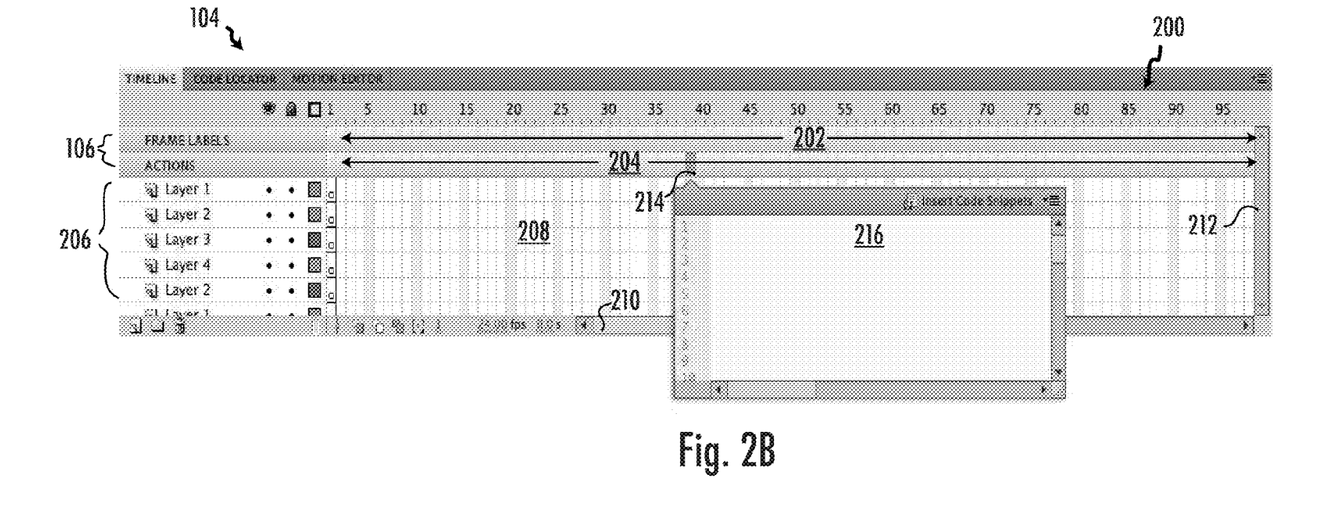

FIG. 2B presents an example of an interface element in timeline interface 104 that can be triggered by selection of the scripting track or an element therein. In this example, selection of cell 214 has spawned an editing interface 216 configured as a pop-up window. Interface 216 can allow for display and/or editing of scripting components of the application. For example, if cell 214 featured a pre-existing scripting element, interface 216 could provide a textual view of the selected scripting element and allow for input editing the element. If cell 214 does not feature a scripting element, interface 216 may allow for input to define a new scripting element. In some implementations, as shown here, interface 216 includes an option to edit by inserting one or more code snippets—predetermined portions of code that can be customized for use by inserting appropriate object and label references.

Figure 2C:
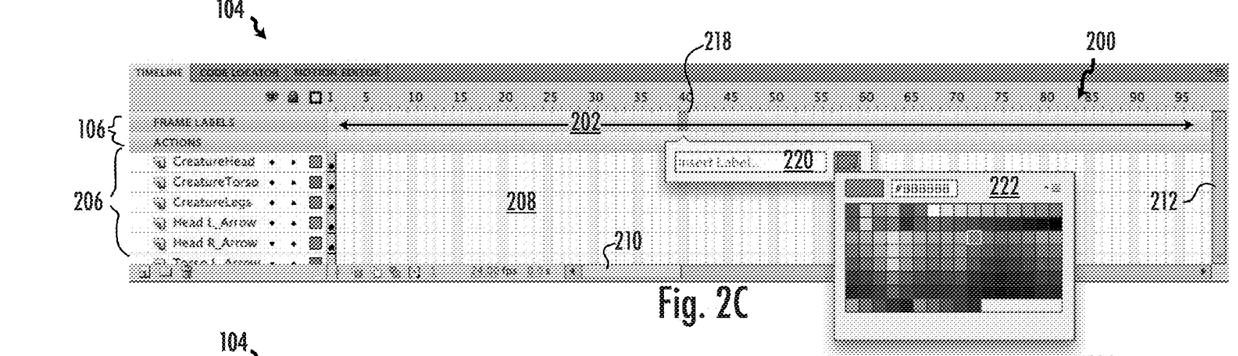

FIG. 2C presents an example of another interface element in timeline interface 104. In this example, selection of cell 218 in labels track 202 has spawned interface 220 which allows a user to define or edit a label to be associated with the selected frame. The label can then be used by other scripting elements (e.g., as a reference to shift a view of the application to that frame in response to an input event). In some implementations, as shown here, the label can be customized though the use of color selection palette 222.

Figure 2D:
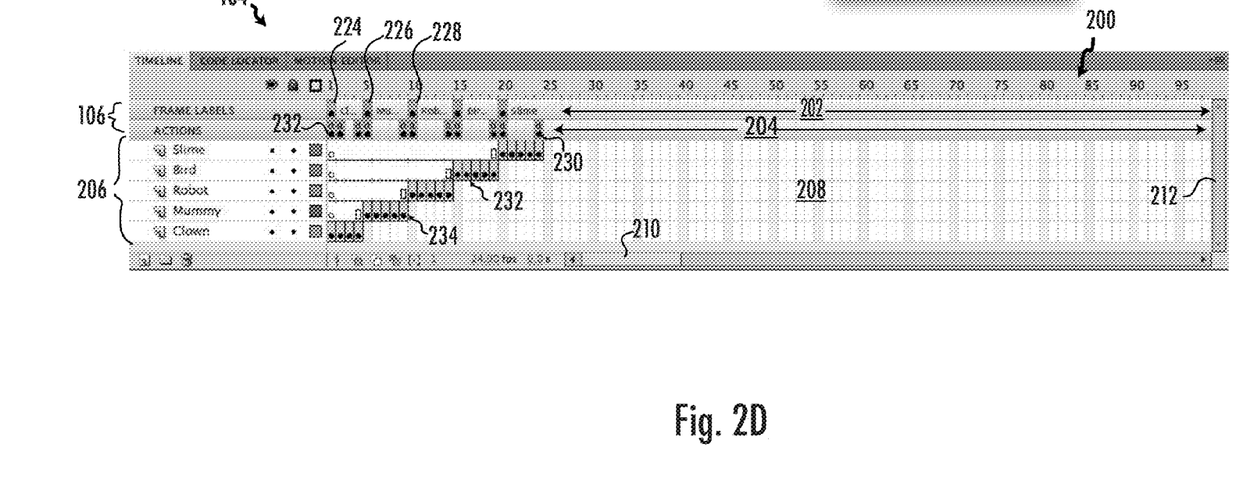

FIG. 2D shows an example of timeline interface 104 as populated by a number of scripting and media elements; for purposes of clarity, not all elements are separately labeled. As shown at 224, 226, and 230, several cells of label track 202 have been populated with elements corresponding to script labels. Actions track 204 is populated with a number of elements corresponding to actions, including elements 232 and 234. Media tracks 206 are also populated—as shown at 236 and 238, elements are included in various cells to indicate frame-by-frame animation, tweening, and other activity.

By way of example, element 226 may designate a key frame during which a frame-by-frame animation indicated at 238 begins. At the end of that animation, as indicated by the element in actions track 204, a scripting element is used, for example to jump to another keyframe.

Figure 3:
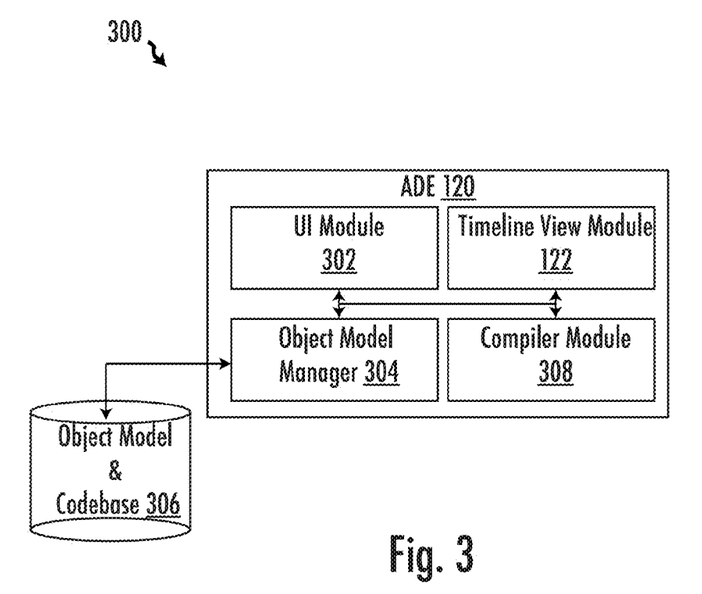
FIG. 3 is a diagram of an illustrative software architecture for a development environment that provides a timeline interface.

FIG. 3 is a diagram showing an illustrative architecture 300 for an application development environment 120 that includes a timeline view module 122. In this example, application development 120 includes a UI module 302 used to provide a graphical user interface and receive user input. For example, the interface can include a timeline view provided by module 122 along with other components such as a design stage and other interfaces (e.g., code view interface, etc.). Object model manager module 304 can access stored data representing a core object model and codebase 306 for the application under development. The object model/codebase can include data representing the various application components, including media elements, scripting components, and the like.

The application components can be indexed by frame or other identifiers used by object model manager 304 in tracking and updating the data defining the application under development. Timeline view module 122 can use a list of the application components to populate the various tracks of timeline interface 104, such as by iterating through the frames of the application under development. For each frame, module 122 can render a corresponding element in each track which has a media element and/or a scripting element associated with the frame.

Timeline view module 122 can further pass data to object model manager 304 in response to input events, such as in response to input selecting a cell in a label or script track and associated with a particular frame. For example, when a new scripting action (or label) is defined, the frame and substantive data for the scripting action (or label) as received in the timeline interface can be passed to object model manager 304 for inclusion in the object model/codebase for the application under development. Additionally, input with respect to media tracks or elements therein can be used to update the object model/codebase in a conventional manner.

ADE 120 also includes compiler module 308. Compiler module 308 can use the object model/codebase to produce executable or interpretable code of the application under development. Output code may, for example, comprise SWF files or AIR files for execution using Adobe® Flash® or AIR®, files for execution in another runtime environment, files for execution in an operating system, or other code such as HTML/CSS code. It will be understood that the present subject matter can be used regardless of the format or type of the application under development, and construction and use of appropriate compilers, linkers, and packaging components (e.g., for cross-platform compatibility) will be within the ability of one of skill in the art.

Figure 4:
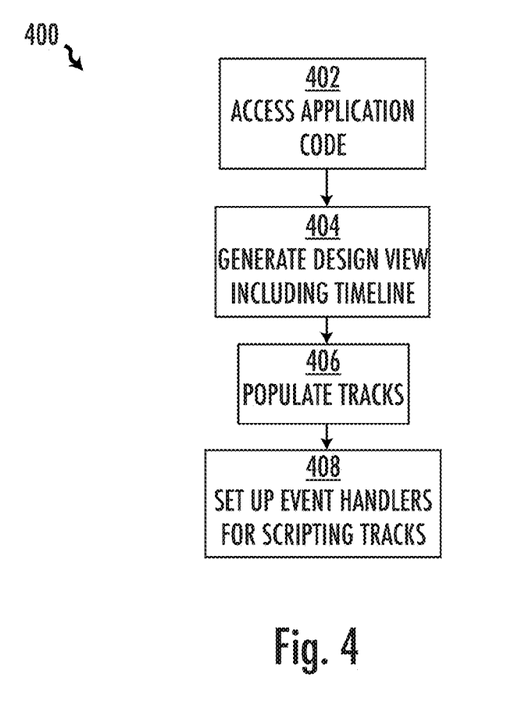
FIG. 4 is a flowchart showing steps in an illustrative processing method for providing a timeline interface.

FIG. 4 is a flowchart showing steps in an illustrative processing method 400 that may be carried out by a computing device 102 implementing a timeline view module 122. Block 402 represents accessing code or another representation of an application stored in a memory, the code defining a plurality of media components of the application and at least one scripting action or label. For example, as noted above, an ADE may maintain a model of the application under development from a codebase and update that model in response to user input.

Block 404 represents generating a design view in a graphical user interface, the design view comprising a timeline view of activity that occurs over time during execution of the application. For example, the timeline view can comprise a plurality of cells and a plurality of tracks as illustrated and discussed with FIGS. 1-2 above, with each track providing a temporal view of a respective media component. The timeline view can also include at least one additional track dedicated for scripting, with each scripting track including one or more cells representing scripting actions or labels associated with respective frames or other temporal units of the application.

Block 406 represents populating the tracks. For example, the tracks may be represented as a plurality of cells extending in a first direction in the timeline view, with the tracks adjacent in a second direction in the timeline view so that cells adjacent in the second direction correspond to activity that occurs at the same time, such as activity at the same frame. Visual elements such as icons, colors, and text can be used to identify the media components associated with respective cells. Similarly, the scripting tracks can be populated with respective icons or other indicators. The particular cells can be identified from the object model or other representation of the application, such as by iterating through the model by frame and including elements in the timeline corresponding to each application component at each respective frame.

Block 408 represents setting up event handlers of the ADE to provide responses to events designating or associated with the scripting tracks. For example, an event handler may configure the ADE to respond to selection of a cell in the scripting track by rendering an editing interface to define a new action or label or to allow editing of an existing action or label associated with the cell. As a particular example, a popup window such as shown in FIG. 2B or FIG. 2C can be presented to allow viewing and/or editing of an action, label, or other script element.

As another example, an event handler may respond to input identifying a cell in the scripting track but attempting to associate some other element other than a scripting action or label with the track. For example, an error handler may be used to present a warning or other feedback if a user attempts to drag a media element into the scripting track.

Method 400 is provided for purposes of illustration only. In practice, an ADE may carry out multiple concurrent processes. For example, the tracks can be updated periodically and/or in response to other input changing the composition of the application. For example, if a user defines an action or label via another interface component (e.g., a code view interface or an interface dedicated to specifying actions), the corresponding frame(s) in the scripting track can be updated.

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

A computing device may access one or more non-transitory computer-readable media that excludes signals and embodies computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the devices operative to implement one or more of the methods of the present subject matter.

Examples of computing devices include, but are not limited to, servers, personal computers, mobile devices (e.g., tablets, smartphones, personal digital assistants (PDAs), etc.) televisions, television set-top boxes, portable music players, and consumer electronic devices such as cameras, camcorders, and mobile devices. Computing devices may be integrated into other devices, e.g. "smart" appliances, automobiles, kiosks, and the like.

Embodiments of the methods disclosed herein may be performed in the operation of computing devices. The order of the blocks presented in the examples above can be varied—for example, blocks can be re-ordered, combined, and/or broken into sub-blocks. Certain blocks or processes can be performed in parallel.

Any suitable non-transitory computer-readable medium or media may be used to implement or practice the presently-disclosed subject matter, including, but not limited to, diskettes, drives, magnetic-based storage media, optical storage media (e.g., CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A computerized device, comprising:
a display adapter; and
a data processing hardware element,
wherein the data processing hardware element implements a timeline view module to provide output via the display adapter to display a timeline of an application that includes activity that occurs over time during execution of the application, the timeline comprising a plurality of tracks and a plurality of cells, each track providing a temporal view of a respective media component of the application by populating a plurality of cells extending in a first direction in the timeline, wherein the tracks are adjacent in a second direction in the timeline so that cells adjacent in the second direction correspond to activity that occurs at the same time,
wherein the plurality of tracks comprise a track corresponding to a plurality of media components of the application, a scripting track providing a temporal view of scripting components of the application, and a label track, the scripting track comprising an action element representing a portion of scripting code defining a series of discrete operations to be performed at a particular time or keyframe by the application, the particular time or keyframe identified by a position of the action element on the timeline, the label track including a label associated with the keyframe of the timeline, the data processing hardware element configured to receive a selection of a cell of the timeline to define or edit the label to be associated with a selected keyframe of the timeline, wherein the label is used by the scripting code.

2. The computerized device of claim 1, wherein the data processing hardware comprises a processor and the timeline view module comprises a program component embodied in a memory device accessible by the processor.

3. The computerized device of claim 1, wherein the timeline view includes an interface element to scroll through the plurality of media element tracks while maintaining a view of the scripting track.

4. The computerized device of claim 1, wherein the timeline view module provides an interface in response to selection of the action element in the scripting track, the interface displaying the scripting code represented by the action element.

5. The computerized device of claim 1, wherein the timeline view module provides an editing interface in response to selection of an element in the scripting track or in response to selection of the scripting track, the editing interface configured to receive input editing a scripting component of the application.

6. The computerized device of claim 1, wherein the timeline view module indicates an error in response to input attempting to include a non-scripting element in the scripting track.

7. A computer-implemented method, comprising:
accessing code of an application stored in a memory, the code defining a plurality of media components of the application and at least one scripting action;
providing, by a processor, output to generate a design view in a graphical user interface, the design view comprising a timeline view of activity that occurs over time during execution of the application, wherein the timeline view comprises a plurality of cells and a plurality of tracks, each track providing a temporal view of a respective media component by populating a plurality of cells extending in a first direction in the timeline view, wherein the tracks are adjacent in a second direction in the timeline view so that cells adjacent in the second direction correspond to activity that occurs at the same time;

populating the timeline view with at least one additional track, the at least one additional track comprising a scripting track comprising an action element representing a portion of scripting code defining a series of discrete operations to be performed at a particular time or keyframe by the application, the particular time or keyframe identified by a position of the action element on the timeline, wherein the at least one additional track comprises a label track including a label associated with the keyframe of the timeline; and receiving a selection of a cell of the timeline to define or edit the label to be associated with a selected keyframe of the timeline, wherein the label is used by the scripting code.

8. The method of claim 7, wherein the at least one scripting action or the label is defined independently of the media components.

9. The method of claim 7, wherein the timeline view displays the at least one additional track while displaying some, but not all, of the plurality of tracks in response to a scrolling command.

10. The method of claim 7, further comprising:
in response to an input event identifying the scripting track, displaying the portion of the scripting code.

11. The method of claim 10, wherein the portion of the scripting code is displayed in a pop up window that is configured to receive an edit to the portion of the scripting code.

12. The method of claim 7, further comprising:
receiving input attempting to include an element other than the scripting action or the label in the at least one additional track; and
in response to the received input, executing an error routine.

13. The method of claim 7, wherein populating the timeline view with the at least one additional track comprises populating the scripting track with cells corresponding to scripted actions and populating the label track with cells corresponding to frame labels.

14. A computer program product comprising a non-transitory computer readable medium embodying program code, the program code comprising:
program code for providing a graphical user interface of an application development environment;
program code for providing, in the graphical user interface, a timeline view that includes activity that occurs over time during execution of an application under development, wherein the timeline view comprises a plurality of cells and a plurality of tracks, each track providing a temporal view of a respective media element by populating a plurality of cells extending in a first direction in the timeline view, wherein the tracks are adjacent in a second direction in the timeline view so that cells adjacent in the second direction correspond to activity that occurs at the same time;
program code for providing, in the timeline view, a default configuration of the plurality of tracks, the default configuration comprising at least one track corresponding to a media element of the application under development, a label track, and a scripting track, the scripting track comprising a visual representation of a scripting element representing a portion of scripting code defining a series of discrete operations to be performed at a particular time or keyframe by the application, the particular time or keyframe identified by a position of the action element on the timeline, the label track including a label associated with the keyframe of the timeline; and
program code for receiving a selection of a cell of the timeline to define or edit the label to be associated with a selected keyframe of the timeline, wherein the label is used by the scripting code.

15. The computer program product of claim 14, further comprising:
program code for responding to an input event designating the scripting track by presenting an interface, the interface configured to display the scripting element.

16. The computer program product of claim 15,
wherein the program code for responding presents the interface to edit an existing scripting element if the visual representation is selected by the input event, and
wherein the program code for responding presents the interface to define a new scripting element if the input event selects a portion of the scripting track that does not include the visual representation.

17. The computer program product of claim 14, wherein the program code for providing the timeline view provides the timeline view in a window in which fewer than all of the plurality of tracks are displayed and in which the scripting track is fixed in location.

18. The computer program product of claim 14, further comprising:
program code for preventing inclusion of an element other than a scripted action or the label in the scripting track.

19. The method of claim 7 wherein the label is used by the scripting code as a reference to shift a view of the application to the selected keyframe in response to an input event.

* * * * *